Nov. 3, 1964 S. L. BROADHEAD, JR 3,155,820

BINARY DIVIDER WITH RADIX CONVERSION FEEDBACK SWITCHING

Filed Jan. 10, 1963 3 Sheets-Sheet 1

INVENTOR.
SAMUEL L. BROADHEAD JR.
BY Moody & Anderson
AGENTS

Nov. 3, 1964 S. L. BROADHEAD, JR 3,155,820

BINARY DIVIDER WITH RADIX CONVERSION FEEDBACK SWITCHING

Filed Jan. 10, 1963 3 Sheets-Sheet 2

INVENTOR
SAMUEL L. BROADHEAD JR.
BY Moody & Anderson
AGENTS

Nov. 3, 1964 S. L. BROADHEAD, JR 3,155,820

BINARY DIVIDER WITH RADIX CONVERSION FEEDBACK SWITCHING

Filed Jan. 10, 1963 3 Sheets-Sheet 3

NORMAL COUNTDOWN $2^n=256$

| SWITCH POSITION INDICATIONS | DESIRED COUNTDOWN | SUBTRACTED COUNT | UNIT SUBTRACTION | TENS SUBTRACTION |
|---|---|---|---|---|
| TENS UNITS | | | | |
| 10 --- 0 | 100 | 156 | 10 | 146 |
| 10 --- 1 | 101 | 155 | 9 | 146 |
| 10 --- 2 | 102 | 154 | 8 | 146 |
| 10 --- 3 | 103 | 153 | 7 | 146 |
| 10 --- 4 | 104 | 152 | 6 | 146 |
| 10 --- 5 | 105 | 151 | 5 | 146 |
| 10 --- 6 | 106 | 150 | 4 | 146 |
| 10 --- 7 | 107 | 149 | 3 | 146 |
| 10 --- 8 | 108 | 148 | 2 | 146 |
| 10 --- 9 | 109 | 147 | 1 | 146 |
| 11 --- 0 | 110 | 146 | 10 | 136 |
| 11 --- 1 | 111 | 145 | 9 | 136 |
| 11 --- 2 | 112 | 144 | 8 | 136 |
| etc. | etc. | etc. | etc. | " |
| 12 --- 0 | 120 | 136 | 10 | 126 |
| 12 --- 1 | 121 | 135 | 9 | 126 |
| etc. | etc. | etc. | etc. | " |
| 13 --- 0 | 130 | 126 | 10 | 116 |
| 14 --- 0 | 140 | 116 | 10 | 106 |
| 15 --- 0 | 150 | 106 | 10 | 96 |
| 16 --- 0 | 160 | 96 | 10 | 86 |
| 17 --- 0 | 170 | 86 | 10 | 76 |
| 18 --- 0 | 180 | 76 | 10 | 66 |
| 19 --- 0 | 190 | 66 | 10 | 56 |
| 19 --- 9 | 199 | 57 | 1 | 56 |

FIG 4

INVENTOR.
SAMUEL L. BROADHEAD JR.
BY Moody & Anderson
AGENTS

United States Patent Office 3,155,820

Patented Nov. 3, 1964

3,155,820

BINARY DIVIDER WITH RADIX CONVERSION FEEDBACK SWITCHING

Samuel L. Broadhead, Jr., Cedar Rapids, Iowa, assignor to Collins Radio Company, Cedar Rapids, Iowa, a corporation of Iowa Filed Jan. 10, 1963, Ser. No. 250,547

9 Claims. (Cl. 235—165)

This invention relates generally to the art of binary division and more particularly to a novel reset feedback arrangement for a cascaded train of binary divider circuits where a multiple switch arrangement enables the adaption of the binary divider chain to a plurality of coundown factors or coundown ratios defined by a numbering system with radix other than the binary radix 2; such as a system with radix 10 in decade fashion.

The count (number of pulses) at the input of a cascade of binary dividers which is required to provide one output pulse is, in the absence of a feedback reset arrangement, equal to $2^n$. Thus, a cascaded arrangement of binary dividers may be utilized to provide a countdown by powers of 2, 4, 8, 16, 32, etc. For the purpose of the present invention, the term binary divider is given to any one of a number of circuits, such as the well-known "flip-flop" circut which has two stable modes of operation defined by the conductive states of the input and output sections. A change in the conductive state is brought about by triggering one of the input or output sections to change its conductive state so as to subsequently reverse the conductive state of the associated section due to cumulative action. Most generally, the trigger is accomplished by the application of a pulse of proper polarity to the conducting section so as to cut off the conducting section and transfer conduction through cumulative action to the associated nonconductive section.

The term binary divider infers the well-known usage of such devices to effect division by repeated subtraction of the divisor from the output.

If it is desired to utilize binary dividers to provide countdown ratios other than powers of 2, a reset feedback system may be employed whereby the input to any divider stage is the normal input plus the outputs of any or all of the subsequent stages. Utilizing this well-known technique in the art, any given cascaded divider chain with a normal coundown of $2^n$ may be modified by the judicious use of a reset feedback system to provide any output coundown ratio less than the normal countdown ratio of $2^n$. These known techniques do not enable a ready means for modifiying any given divider chain so as to produce a number of integral countdown ratios with a minimum of circuitry and, more importantly, do not permit a change from one particular countdown to another without time-consuming modification. That is to say, there is lacking in the art, a means for readily altering feedback permutations with a minimum of circuitry so as to arrive at preselected different countdown ratios.

Consider, for example, that a particular divider chain, whose normal countdown is in excess of one hundred, is to be adapted to provide one hundred different integral countdown ratios. The output pulse might conceivably be switched into one hundred different feedback combinations so as to produce one hundred changes in dividing factor. While this scheme would lead to the desired end result, it approaches the impractical, due to the complex switch arrangement necessitating one hundred switch positions each with a multiple feedback tie-in to the binary divider chain to produce the changes in dividing factor.

It is an object of the present invention to permit selection of the dividing ratio through judicious feedback of two or more pulses per output cycle with each of the pulses being separated on a time basis and applied individually to associated switching means, each of which effects a change in the dividing factor in steps of a different power of a selected radix. In the above example, the one hundred desired changes in dividing factor may be realized by the employment of two decade (10 position) switches wherein the setting of each of but two switches to ten different positions effects the one hundred changes in countdown ratio as compared to the one hundred switch positions which would normally be required for such an adaption.

A further object of the present invention is the provision of a versatile binary divider in association with a plurality $m$ of N-position switches by which $N^m$ different feedback combinations and thus $N^m$ different countdown factors, based on the radix N, may be realized by the setting of $m$ switch positions.

A still further object of the present invention is the provision of means to increase the versatility of a binary divider by employing reset feedback as effected by a plurality of switches, each of which effects a predetermined feedback of one of a plurality of time-separated pulses which are not coincident with one another or with those developed in the divider chain.

A feature of the present invention is the employment of a switching arrangement to effect reset feedback permutations in a binary divider chain in a manner such that the dividing factor corresponding to any combination of positions of switches may be read directly as integers identifying the switch positions.

The invention is further featured in the provision of means for converting each output pulse from a binary dividing chain into a plurality of time-separated pulses for individual application to a like-plurality of N-position switching means through which feedback paths to appropriate stages of the binary divider chain will effect a change in the countdown ratio of the divider in a manner based on a number system with radix N.

These and further objects and features of the invention will become apparent upon reading the following description in conjunction with the accompanying drawings, in which:

FIGURE 4 is a table illustrating the binary subtractive principles utilized in the embodiment of FIGURE 1.

As above discussed, the present invention enables a multiple switching arrangement to adjust the coundown ratio of a binary divider chain by utilizing more than one output pulse per output cycle for reset feedback purposes. If means are included to develop from each output pulse a plurality of pulses which are not coincident with the input or subsequent divider chain pulses, each of these plurality of pulses may be distributed to an individual trigger line and each of the trigger lines may be fed back into the cascade arrangement to effect a subtraction of the normal countdown ratio with the total countdown ratio subtraction being the sum of the individual substractions. The present invention utilizes this by an arrangement of output pulse multiplication coupled with a separation of the multiplied pulses for feeding through a plurality of switches for desired feedback permutations.

Since the feedback employed in binary divider chains operates upon a reset principle as concerns the conductive states in the binary divider chain, the present invention provides means to avoid pulse coincidence between the plural feedback pulses and the divider chain pulses. Ideally, the plurality of feedback pulses might occur within the input pulse period.

The present invention may best be understood by consideration of a specific basic example in which a switching arrangement based on the familiar decade numbering system with radix 10 is utilized and in which two output pulses per output cycle are developed and utilized in conjunction with two decade switches to effect one hundred different integral countdown ratios. Such a system is shown in the embodiment of FIGURE 1 which includes a development of the necessary time-space separated plural output pulses per cycle by a simple differentiation scheme coupled with a pulse polarity separation technique.

Figure 1:
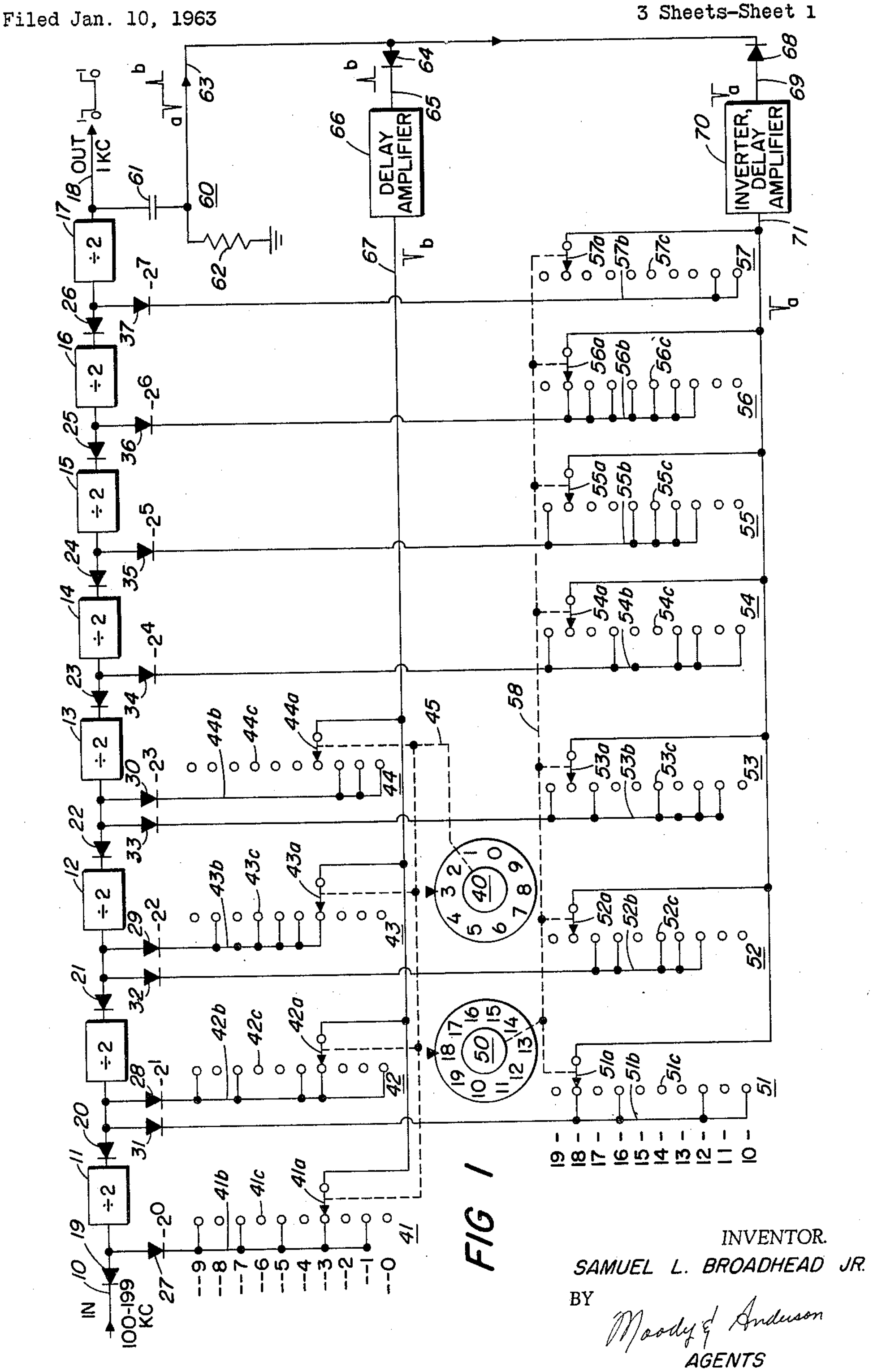
FIGURE 1 illustrates a particular embodiment of the present invention for the adaption of a binary divider chain to one hundred different coundown ratios employing a pair of decade switching means.

With reference to FIGURE 1, there is illustrated a chain of binary divider stages 11–17 to which an input 10 is provided and from which an output 18 is taken. The binary divider chain operates, in the absence of the feedback arrangement, to provide a countdown ratio of $2^n$, and, for the eight-stage embodiment illustrated, the normal countdown ratio is 256; that is, for each 256 input pulses 10, one output pulse 18 would occur. The input pulses 10 and the outputs of each of the dividers 11–16 are applied to the subsequent binary divider through diodes 19–26. Diodes 19–26 isolate the input pulses and the outputs of each of the stages from the feedback pulses. In the embodiment illustrated, the feedback pulses are negative pulses utilized to reset the input stage of each of the dividers from a conductive to a nonconductive state. Each of the reset trigger pulses, as fed back to the inputs throughout the divider chain, are applied through diode members 27–37. Diodes 27–37 act as further isolation elements to provide isolation between the negative output pulses from each of the divider stages and from the feedback switching arrangement.

As previously discussed, one might take the output 18 and feed it back in one hundred different permutations to arrive at one hundred different integral countdown ratios. The present invention, as embodied in FIGURE 1, utilizes two decade switches to readily effect one hundred integral countdown ratios by developing two output pulses during each output cycle. The development of two reset pulses per output cycle is readily implemented by differentiating the output to provide two pulses per cycle. Accordingly, the output 18 is applied through differentiating network 60 comprising capacitor 61 and resistor 62 to provide an output on line 63 comprised of two pulses *a* and *b* for each output pulse 18. The positive pulse *b* on line 63 is passed through the appropriately polarized diode 64 such that the input to delay amplifier 66 is comprised of a series of positive pulses each of which occurs during the period of one output pulse 18. The positive pulses 65 are inverted and delayed in amplifier 66 and appear on trigger line 67 as a series of negative pulses and thus of proper polarity to effect reset feedback. The negative pulses (*a*) from the differentiator 60 are blocked from trigger line 67 by diode 64 but are carried through oppositely polarized diode 68 to provide a series of negative-going pulses as an input 69 to an inverter amplifier 70 which likewise includes a time delay to prevent coincidence between pulses (*a*) and the output pulses 18. The output from amplifier 70 appears on a second trigger line 71 as a series of negative pulses of proper polarity for feedback reset and which, because of the delay within amplifier 70, are not time-coincident with output pulse 18. Two series of trigger pulses are thus developed for each output cycle of the binary divider chain and the two series of pulses are separated, each to its own trigger line, for feedback reset purposes.

It should be noted that the feedback principle utilizing multiple pulses developed in response to each output cycle necessitates a delay in the pulses prior to their being used for reset feedback purposes. It is of course imperative that the feedback pulses must not be respectively coincident nor can they be coincident with the occurrence of the various pulses occurring through the binary chain. Coincidence between the normal triggering pulse within the chain and a feedback pulse applied at the same point within the chain would render the feedback pulse ineffective in subtracting count. Since in any binary divider chain, one output pulse occurs for some predetermined number of input pulses, and the time occurrences of the output pulses as concerns both leading and trailing edges are time-coincident with some particular cycle of the input to the chain, the present invention, as embodied in FIGURE 1 employs delay amplifiers to insert a slight delay to each of the feedback pulse delays such that they will not be coincident with those occurring normally within the divider chain.

Each positive output pulse *b* occurring when the binary divider chain goes from the 11111110 state to the 00000001 state is fed back as a negative pulse on trigger line 67 through a first decade switch 40 to subtract 1 to 10 counts switched in steps of 1.

Each negative output pulse (*a*) occurring when the binary divider chain goes from the 11111111 state to the 00000000 states is fed back as a negative pulse on trigger line 71 through a second decade switch 50 to subtract counts in steps of 10. Since the feedback pulses on trigger lines 67 and 71 are not time coincident, they may be applied through the switches 40 and 50 as feedback to the same stage within the binary chain. In the embodiment illustrated in FIGURE 1, the normal countdown ratio is $2^3$ or 256. The separation of each output pulse into two pulses as described, enables two decade switches to effect one hundred different countdown ratios in sequential decade fashion by effecting the appropriate binary subtractions within the chain. The outputs from each of the binary stages from 11 to 17 may be considered as being weighted in terms of increasing integral powers of the base 2 as illustrated in the figure. For purposes of illustration, the one-hundred possible different countdown ratios might be considered as those which effect a one kilocycle output 18 from inputs ranging from 100 through 199 kilocycles in unit steps. In this application the switches are so wired that countdown ratios from one hundred through 199 may be set into the system and the countdown ratios read directly from the units and ten's representations on the switches. Since we are concerned with decade switching, it is obvious that the units switch 40 must effect a different countdown for each of the ten positions thereof. Similarly, the ten's countdown switch 50 effects a given subtraction for each position thereof. The sum of the subtractions effected by the two switches must be such that when subtracted from the normal countdown of 256, the desired countdown is realized.

Considering, for example, the functioning of the units decade switch 40, the figure illustrates the switch as being comprised of four switch sections 41–44, having rotors **41*a*–44*a* and stator contacts 41*c*–44*c*. Certain ones of the stator contacts of each section are connected in common and through an isolating diode to the input of one of the first four stages in the binary divider chain. Now, considering each position of the ganged rotors 41*a*–44*a* as being identified by a desired unit's digit, the interconnections between the stator contacts for each switch position are chosen in binary permutations so as to effect a subtraction within the divider chain of the number of counts which are complementary to the number 10. Position "0" of switch 40 is seen to effect reset trigger pulse connections through switch sections 42 and 44 which are respectively connected through diodes 28 and 30 to effect subtraction of $2^1$, and $2^3$, the sum of which is 10. Similarly, position 1 of switch 40 effects subtractions of $2^0$ plus $2^3$ for a total of 9. In the illustrated position of switch 40**, the units digit 3 is selected and subtractions of $2^0$, $2^1$, and $2^2$ are effected for a total of 7.

Switch 40 is seen then to function as a means for effecting subtractions in unitary steps from 0 through 9 from the normal countdown ratio of 256. The remaining countdown subtraction is effected by the second decade switch 50 in conjunction with pulses 71 and, in the illustrated example, is employed to effect subtractions from 56 through 146 in steps of 10. Switch 50 is comprised of a plurality of ten-position switch wafers 51–57 with rotors 51*a*–57*a* positioned through mechanical interconnection 58 to corresponding stator contacts 51*c*–57*c*. As with the units switch 40, certain permutations of stator contacts of the 10's switch are connected to a common line and through isolating diodes to the inputs of appropriately weighted stages in the binary chain for reset subtraction purposes.

The subtractive principle, as concerns the connection of trigger pulses 71 to the binary chain, and the manner in which they cooperate with the units digits subtractions effected by switch 40, may best be seen by reference to the table of FIGURE 4. FIGURE 4 illustrates that position 10 of switch 50, in conjunction with the ten positions 0 through 9 of the units switch 40, is effective in developing countdown ratios from 100 through 109. The desired countdown is seen to be readable directly from the two switch positions. The difference between the desired countdown and the normal countdown of 256 is seen to vary from 156 to 147 in unit steps. Thus the unitary reductions are readily effected through switch 40 by subtractions of 10 through 1, while the 10's switch provides a constant subtraction of 146. The switch positions of switch 50 in FIGURE 1 may then be identified in terms of the desired 10's digit as concerns countdown and the stator contacts of appropriate sections of switch 50 connected to effect reset in a binary fashion, such that the total desired subtraction is realized. For example, for a selected countdown ratio of one hundred, the 10's switch 50 effects subtractions of $2^0$, $2^4$, and $2^7$, for a total of146. The table in FIGURE 4 is continued in brief for the 10's switch positions 11–19 to illustrate that in each case the unitary changes in countdown are effected by the units decade switch 40 with the balance of the necessary subtractions being inserted by the 10's switch 50. Thus, for countdown ratios of 110 through 119, the 10's switch 50 (in position 11) must effect a subtraction of 136 counts and reference to FIGURE 1 shows that this is realized by the subtraction of $2^3$, and $2^7$ for a total of 136. The embodiment of FIGURE 1 is thus seen to provide a means to alter the normal countdown ratio of a binary divider chain to one hundred different integral countdown ratios, any one of which may be easily realized by the simple positioning of two switches from which the desired countdown ratio may be directly read in terms of 10's and units digits.

Since this invention develops a plurality of feedback trigger pulses from each output cycle, the feedback pulses become effective upon initial operation only when a number of input pulses corresponding to the normal countdown of the divider chain have been applied. The device then might be considered to reach an operative condition in effecting a selected countdown only after a predetermined number of input pulses have been applied, the number corresponding to the normal countdown ratio developed by the binary chain.

It should be noted that in the embodiment of FIGURE 1, an eight stage binary divider was necessary, since the highest countdown ratio desired was 199. Generally expressed, the highest countdown ratio desired necessitates a divider chain of *n* stages, such that $2^n$ is greater than the highest countdown ratio and $2^{n-1}$ is less than the highest countdown ratio desired. In the example illustrated, 199 is seen to be greater than 128 but less than 256. It may further be generally noted that the number of decade switches which may be employed defines and is ultimately limited by, the number of output trigger pulses per output cycle which may be separated. The present invention is readily adaptable to further adaptions based on the decade switching principle by providing means to develop three or more feedback pulses per output cycle and to employ a like number of decade switches to permit the selection of $10^m$ integral countdown ratios in decade fashion where *m* is the number of decade switches employed and corresponds to the number of feedback pulses developed per output cycle.

The embodiment of FIGURE 1 uniquely provided the necessary two pulses per output cycle by a simple differentiation with pulse separation being effected in terms of polarity. A further and more generalized embodiment of the present invention is illustrated in FIGURE 2, wherein pulse separation is effected on a time basis.

Figure 2:
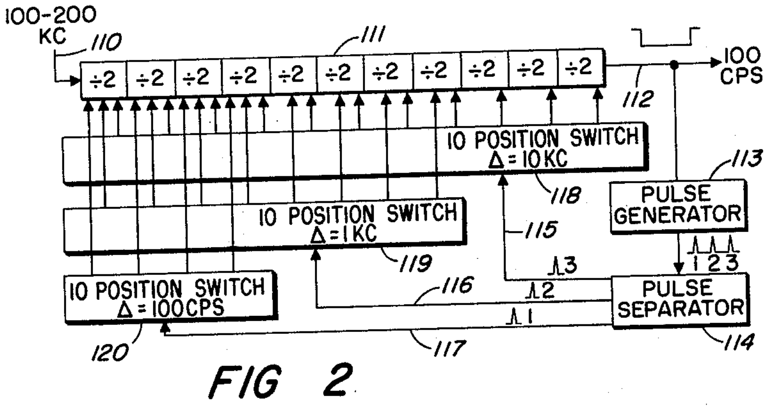
FIGURE 2 is a functional representation of a further generalized embodiment of the present invention providing one thousand ratios.

FIGURE 2 represents a binary divider in accordance with the present invention by which a divider chain may be adapted to provide one thousand different integral countdown ratios using decade switching. An input signal 110 is applied to a binary divider chain 111 to provide an output 112 representing any one of one-thousand different countdown ratios. In accordance with the invention, the output 112 is applied to a pulse generating means 113 which, in response to each output cycle, develops a train of three pulses. Three pulses are necessary, as above described, since $10^m$ must equal 1,000. In accordance with the above discussion, *m* designates the number of decade switches necessary. Each of the three pulses developed in pulse generator 113 must be separated to individual trigger lines for feedback purposes and thus the output of pulse generator 113 is applied to a pulse separator 114 to distribute the pulses 1–3 to trigger lines 117, 116, and 115 respectively.

Three decade switches 118, 119, 120, receive the separated trigger pulses and apply them as reset feedback to the counter chain 111. For purposes of illustration, the embodiment of FIGURE 2 shows the input 110 as being from one-hundred to two-hundred kilocycles. Considering the input to be step variable from 100 to 200 kilocycles in 100-cycle increments, it is seen that 1,000 such increments are defined and the decade switches 118, 119, and 120 operate to effect the necessary one thousand countdown ratios to maintain the output at 100 c.p.s. It is seen that decade switch 118 effects subtraction from the count in 10-kilocycle increments; that decade switch 119 effects count subtractions in one-kilocycle increments; and that decade switch 120 effects countdown subtractions in the least, or 100-cycle, increments. Now, the greatest countdown ratio to be developed is seen to be 2,000 to one. In accordance with the invention, the binary divider chain 111 must accordingly be comprised of a sufficient number of stages *n* such that $2^{n-1}<2000<2^n$. Thus, the number of stages *n* is illustrated as being 11, since $2^{11}$ equals 2,048, while $2^{10}$ equals 1,024. The switches 118, 119, 120, and the manner in which they are interconnected with the binary chain 111, are similar to the detail discussed in FIGURE 1. As with the embodiment of FIGURE 1, the selected countdown ratio may be read directly from the digits identifying the switch positions in a decade fashion.

Figure 3:
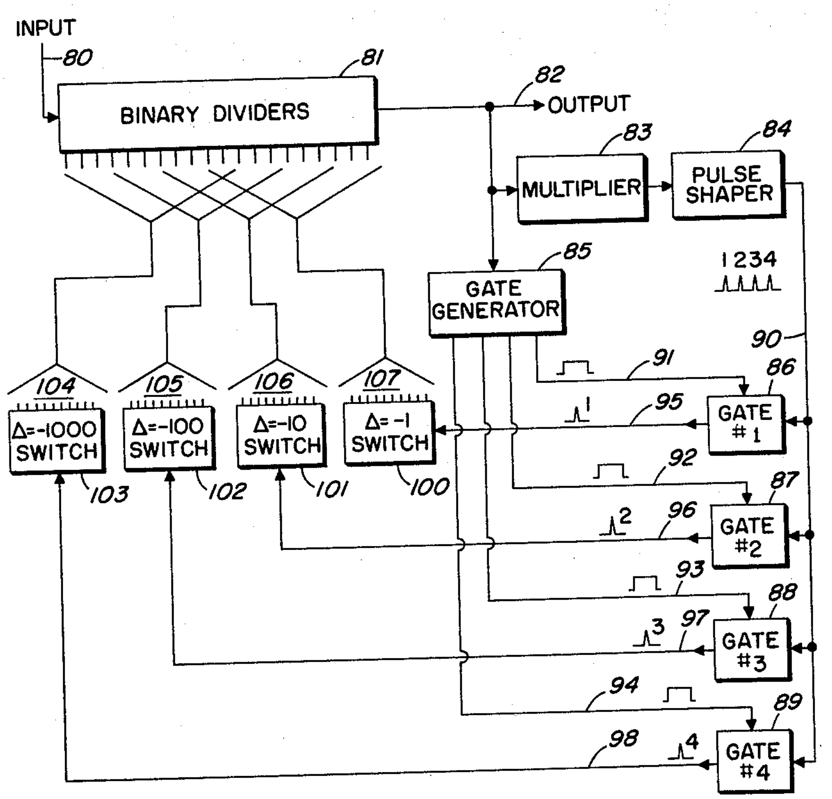
FIGURE 3 is a further representation of the adaption of a binary divider for the provision of ten thousand different countdown ratios employing four decade switches.

FIGURE 3 represents a further generalized embodiment of the invention wherein 10,000 different integral countdown ratios may be effected and further discloses a means to implement the pulse-generating and pulse-separating functions discussed previously with respect to the embodiment of FIGURE 2. An input 80 is applied to a binary divider chain 81 to provide an output 82. In the embodiment of FIGURE 3, 10,000 or $10^4$ different countdown ratios are desired, thus four pulses are developed in response to each output cycle for use in conjunction with four decade switches to effect the subtractive feedback. Thus, the output 82 is applied through a multiplier 83, which, for example, might be a synchronized multivibrator with a repetition rate chosen to develop four output pulses responsive to and during the period of each output cycle 82. The four pulses might be applied through a pulse shaper 84 to develop four well-defined pulses on a common line 90. Line 90 is connected to each of four gates, 86, 87, 88, and 89. The distribution of the four pulses may be accomplished by further applying the output 82 to a gate generator 85 to develop four distributed gate pulses 91, 92, 93, and 94 for application to gates 86, 87, 88, and 89, respectively. With this arrangement, pulse 1 is distributed to line 95, pulse 2 is distributed to line 96, pulse 3 is distributed to line 97 and trigger pulse 4 is distributed to line 98. The lines 95–98 are connected to decade switches 100–103 respectively. The output from the decade switch 100 effects count subtraction in single units by connecting line 95 to appropriate combinations of the binary dividers 81. The multiple output of switch 100 is generally designated by reference numeral 107; it being realized that the details of the switching function are similar to those of the embodiment of FIGURE 1. In similar fashion, decade switch 101, provides an output combination to the appropriate binary dividers to subtract the count in units of 10. The remaining decade switches 102 and 103 provide outputs 105 and 104 which distribute lines 97 and 98 to appropriate stages of the binary divider 81 for count subtractions in units of 100 and 1,000, respectively. The embodiment of FIGURE 3 does not indicate the number of stages in binary divider 81. The number of stages, in accordance with the invention, is determined by the highest countdown ratio desired. The number of decade switches $m$ permits $10^m$ different countdown ratios to be selected. The relative magnitude of the countdown ratio from which counts are to be subtracted defines the number of stages in the divider chain 81. As an example, if the divider 81 in conjunction with the switches were to provide a countdown in unit increments from one through 9,999, the embodiment of FIGURE 3 would include fourteen stages, since $2^{14}$ (16,384), is greater than 9,999, while $2^{13}$ (8,192) is less than 9,999.

It should be realized that, in any embodiment, the number of stages $n$ might be greater than the optimum defined herein. Obviously, a greater number is unnecessary and would require unnecessary subtractive feedback.

Although the invention has been described with respect to particular embodiments thereof, it is not to be so limited. Numerous multiple pulse-developing techniques and pulse-distributing techniques may obviously be employed. Using a decade system, the invention may provide, in general, $10^m$ different countdown ratios, with $m$ defining the number of decade switches employed and defining the number of feedback pulses per output cycle necessary. Thus, the principle may be extended beyond the illustrated embodiments and is seen to be limited in the number of countdown ratios which might be realized only by the extent to which the time between reset trigger pulses is consistent with the time necessary to effect a change in conductive states in the binary dividers.

Further, the invention contemplates the use of switching in units defined by a numbering system with a radix other than 10. In general, the multiple feedback pulse application is adaptable for $N^m$ countdown ratios using $m$ multiple switches in conjunction with $m$ pulses per output cycle and with each switch having N positions.

I claim:

1. Means for adapting a cascaded plurality of $n$ trigger circuits receiving a train of input pulses and having an inherent countdown ratio of $2^n$ to provide a plurality of countdown ratios each less than $2^n$ and each being selectible by the positioning of a plurality of $m$ switching means, each said switching means having N positions, whereby $N^m$ countdown ratios may be effected by the positioning of said switching means; said means comprising pulse generating means responsive to each output cycle of said plurality of trigger circuits to provide a plurality of $m$ like-polarity pulses, means for delaying said plurality of pulses to prevent coincidence therebetween and with the input pulses to said plurality of trigger circuits, means for distributing each of said plurality of pulses to a corresponding and separate trigger feedback line, each of said trigger lines individually connected to one of said $m$ switching means, each of said switching means being adapted in selected positions thereof to effect predetermined feedback connections of said trigger pulses to said plurality of trigger circuits and thereby effect $N^m$ different integral countdown ratios between said input pulses and the output from said plurality of trigger circuits, each of said countdown ratios being identified by said switch positions as an integer $N^{m-1}+N^{m-2}+ \ldots N^0$.

2. Means as defined in claim 1 wherein said plurality of $m$ pulses are generated within the duration time of each input pulse to said plurality of trigger circuits.

3. Means as defined in claim 1 wherein the output of each of said plurality of trigger circuits is coupled to the succeeding circuit through unilateral conduction means of predetermined polarity and wherein each of said plurality of generated trigger pulses is connected through said switching means to the selected ones of said trigger circuits through a unilateral conduction device of like polarity.

4. Means for adapting a cascaded plurality of $n$ trigger circuits receiving a train of input pulses and having an inherent countdown ratio of $2^n$ to provide a plurality of countdown ratios each less than $2^n$ and each being selectible by the positioning of a plurality $m$ of decade switching means, whereby $10^m$ countdown ratios may be effected by discrete positions of each of said $m$ decade switching means; the inputs to each of said binary dividers being weighted consecutively from $2^0$ through $2^{n-1}$, pulse generating means connected to the output of the $n$th and last binary divider to provide a plurality of $m$ like-polarity pulses in response to each output pulse, means delaying said pulses to prevent coincidence thereof with said input pulses, pulse separating means receiving the output from said pulse generating means and producing therefrom a time-space separated feedback pulse corresponding to each of the outputs of said generating means, with each of said train of pulses being transferred to a corresponding and separate trigger line, each of which trigger lines connected individually to one of said $m$ decade switching means, each of said switching means being adapted in selected positions thereof to effect predetermined feedback connections of said trigger pulses to the inputs of selected ones of said plurality of trigger circuits, one of said switching means consecutively effecting a countdown ratio reduction in integral steps of $10^{m-1}$ and the others of said decade switching means effecting countdown ratio reductions in consecutive lesser steps of $10^{m-2}$, $10^{m-3} \ldots 10^0$, respectively, whereby the plurality of $m$ decade switching means in being positioned to $10^m$ switching combinations effects $10^m$ integral output countdown ratios between the input to and output from said plurality of trigger circuits.

5. Means as defined in claim 4 wherein each of said plurality of $m$ pulses occurs within the duration time of one of said input pulses.

6. An arrangement as defined in claim 4 further including means wherein the decade switching means associated with the feedback effecting the least of the countdown ratio reductions effects a discretely different feedback permutation for each of ten switching positions thereof and wherein each of the remaining plurality of $m$ decade switching means effects a discretely different countdown ratio reduction for each switch position thereof; one of said decade switching means effecting connections to the inputs of the cascaded trigger circuits for those trigger circuits having outputs weighted from $2^0$ through $2^3$ so as to effect sequential countdown subtractions corresponding to the decade complement of the units digit defining a selected countdown ratio, and with subsequent ones of said decade switching means effecting connection of their associated trigger pulses to the inputs of selected like and successive ones of said trigger circuits to effect integral countdown ratio subtractions by steps of $10^2$ through $10^m$, respectively, for successive positions thereof.

7. An arrangement as defined in claim 4 wherein said pulse generating means comprises differentiating means and wherein said pulse separating means comprises oppositely polarized unilateral conduction devices receiving the output from said differentiating means, first and second amplifying means receiving the output from each of said unilateral conduction devices, whereby each of said output pulses from said plurality of binary dividers develops first and second feedback trigger pulses at the outputs of said first and second amplifying means, respectively, the first of said trigger pulses effecting through first decade switching means countdown ratio reductions in steps of a first power of 10 and the other of said trigger pulses through a second decade switching means effecting sequential countdown ratio reductions in steps of a second power of ten.

8. An arrangement as defined in claim 4 wherein said pulse generating means comprises a multiplier receiving the output from the *n*th one of said trigger circuits and developing therefrom a plurality of *m* pulses for each of said input pulses thereto; a gate generator receiving the output from the *n*th one of said trigger circuits and generating therefrom a plurality of output gates respectively coincident with consecutive ones of the output pulses from said multiplying means; a plurality of pulse gating means each receiving the train of output pulses from said multiplier and one of the output gates from said gate generator and being adapted in the presence of its associated gate pulse to pass the coincident one of said plurality of the pulses from said multiplying means to one of a like number of decade switching means, each switching means in successive positions thereof effecting connection of the associated input pulse thereto to predetermined ones of said plurality of trigger circuits to effect said reduction in the countdown ratio between the input and output of said cascaded plurality of trigger circuits.

9. An arrangement as defined in claim 4 wherein each of the positions of said plurality of decade switching means is identified by the decade integer corresponding to the countdown ratio effected thereby; whereby the countdown ratio effected by each of the $10^m$ switch combinations may be directly read as the identifying switch positions.

References Cited in the file of this patent

UNITED STATES PATENTS

| | | |
|---|---|---|
| 2,669,388 | Fox | Feb. 16, 1954 |
| 2,913,179 | Gordon | Nov. 17, 1959 |